US012656367B2

(12) United States Patent
Keitaanniemi et al.

(10) Patent No.: US 12,656,367 B2
(45) Date of Patent: Jun. 16, 2026

(54) ACOUSTIC WIND MEASUREMENT

(71) Applicant: Vaisala Oyj, Helsinki (FI)

(72) Inventors: Joonas Keitaanniemi, Espoo (FI);
Samuli Laukkanen, Rajamäki (FI)

(73) Assignee: Vaisala Oyj, Helsinki (FI)

( * ) Notice: Subject to any disclaimer, the term of this patent is extended or adjusted under 35 U.S.C. 154(b) by 376 days.

(21) Appl. No.: 18/391,268

(22) Filed: Dec. 20, 2023

(65) Prior Publication Data

US 2024/0210439 A1    Jun. 27, 2024

(30) Foreign Application Priority Data

Dec. 22, 2022    (EP) ..................................... 22215917

(51) Int. Cl.
G01P 5/24 (2006.01)
(52) U.S. Cl.
CPC .............. G01P 5/244 (2013.01); G01P 5/245 (2013.01)
(58) Field of Classification Search
None
See application file for complete search history.

(56) References Cited

U.S. PATENT DOCUMENTS 4,174,630 A * 11/1979 Nicoli ........................ G01P 5/18
                                                         73/170.13
2022/0099697 A1    3/2022 Arens et al.

FOREIGN PATENT DOCUMENTS

GB        2540737 A    2/2017

OTHER PUBLICATIONS

European Search Report, as issued in connection with European Application No. EP 22 21 5917, dated May 25, 2023, 2 pgs.

* cited by examiner

*Primary Examiner* — John E Breene
*Assistant Examiner* — Alex T Devito
(74) *Attorney, Agent, or Firm* — MASCHOFF BRENNAN; Paul G. Johnson

(57)        ABSTRACT

A wind measurement apparatus comprises: a frame assembly; four transducers mounted to the frame assembly such that their locations serve as vertices of a regular tetrahedron; and a reflector assembly mounted to the frame assembly, positioned substantially at a center of said regular tetrahedron to allow for airflow between the reflector assembly and the transducers. The reflector assembly comprises a reflector element provided as a solid that has eight vertices and six substantially identical concave faces that serve as reflector surfaces and that is oriented such that each transducer is facing a respective vertex of the reflector element. Each transducer is arranged to: transmit a TX beam towards the reflector assembly such that the TX beam meets the three reflector surfaces that meet at the vertex of the reflector element faced by the transducer, and receive, via said three reflector surfaces, partial reflections of TX beams originating from other transducers.

14 Claims, 3 Drawing Sheets

CTRL     <u>100</u>

112-1

112-2

CONTROLLER

130

112-3

112-4

Wind characteristics

ACOUSTIC WIND MEASUREMENT

TECHNICAL FIELD

The example and non-limiting embodiments of the present invention relate to an anemometer apparatus for acoustic wind measurement.

BACKGROUND

Knowledge of wind conditions is important for a number of human activities, both in professional and in recreational fields. In this regard, accurate and reliable measurement of wind speed and wind direction is essentially important for example in aviation and marine operations as well as in industrial contexts such as energy production by wind turbines. One of the techniques currently applied for measurement of wind speed and wind direction in such professional contexts involves measurement of time of flight of a sound signal using a dedicated measurement apparatus that comprises one or more pairs of a transmitter and a receiver. In such a measurement apparatus each pair of a transmitter and receiver may serve to provide a respective measurement path, whereas three or more measurement paths are typically considered as a requirement for reliable measurement of the wind speed and wind direction. Typically, increasing number of measurement paths results in increased accuracy and reliability of the measurement, whereas increasing the number of measurement paths typically also increases the number of components required for the measurement apparatus, which in turn typically result in increasing structural complexity and increasing manufacturing cost of the measurement apparatus.

SUMMARY

It is an object of the present invention to provide a wind measurement apparatus that enables accurate, reliable and robust measurement of wind speed and wind direction while still being relatively simple in structure.

According to an example embodiment, a wind measurement apparatus is provided, the apparatus comprising: a frame assembly; four transducers mounted to the frame assembly such that their respective locations serve as respective vertices of a regular tetrahedron; and a reflector assembly mounted to the frame assembly such that it is positioned substantially at a center of said regular tetrahedron at a distance from the transducers to allow for an airflow between the reflector assembly and each of the transducers, wherein the reflector assembly comprises a reflector element provided as a solid that has eight vertices and six substantially identical concave faces that serve as respective reflector surfaces and that is oriented with respect to said transducers such that each transducer is facing a respective vertex of the reflector element, wherein each transducer is arranged to: transmit a respective measurement signal in a respective transmitter beam, TX beam, towards the reflector assembly such that the respective TX beam meets the three reflector surfaces that meet at the vertex of the reflector element faced by the respective transducer, and receive, via said three reflector surfaces, respective partial reflections of respective TX beams originating from other ones of said transducers.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1A schematically illustrates some components of a wind measurement apparatus according to an example.

DESCRIPTION OF SOME EMBODIMENTS

Figure 1A:
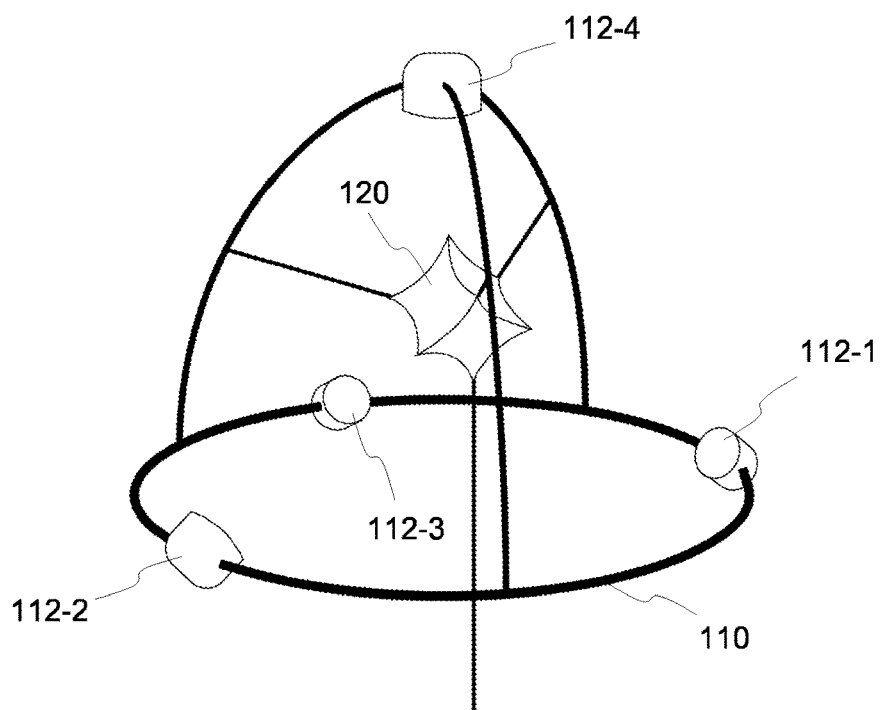
FIG. 1B schematically illustrates some components of a wind measurement apparatus according to an example.
Figure 1B:
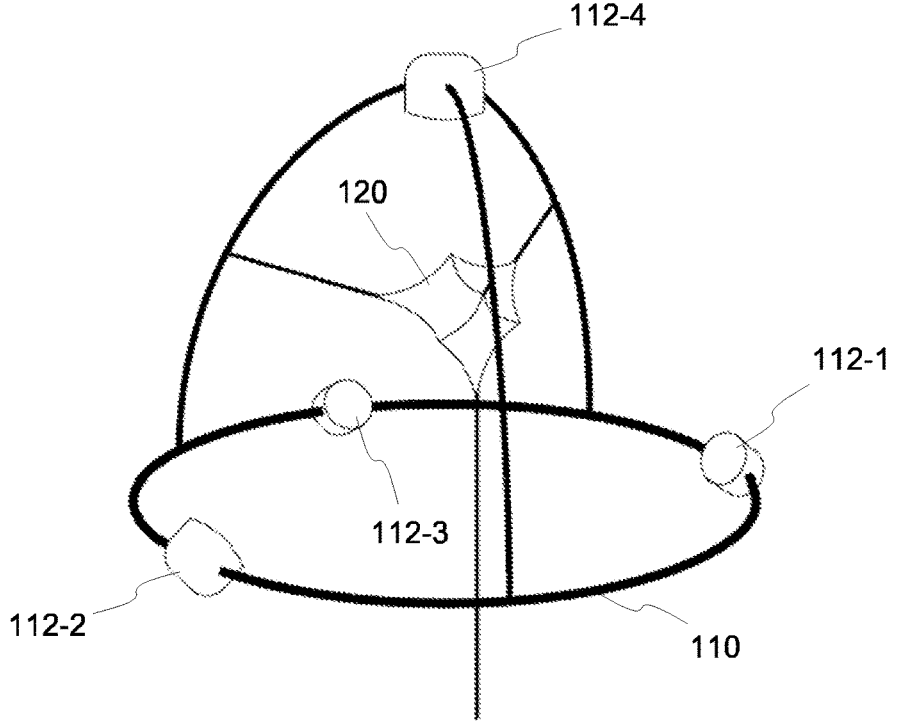

FIGS. 1A and 1B schematically illustrate some components of a wind measurement apparatus 100 according to respective examples. The wind measurement apparatus 100 comprises a frame assembly 110, four transducers 112-1, 112-2, 112-3, 112-4 and a reflector assembly 120. The transducers 112-1, 112-2, 112-3, 112-4 and the reflector assembly 120 are mounted to the frame assembly 110 such that respective locations of the transducers 112-$k$ define a measurement volume, whereas the reflector assembly 120 is disposed within the measurement volume. In this regard, each of the transducers 112-1, 112-2, 112-3, 112-4 is disposed at a distance from the reflector assembly 120 to allow for an airflow through a gap between the reflector assembly 120 and the respective one of the transducers 112-1, 112-2, 112-3, 112-4. The arrangement of the transducers 112-1, 112-2, 112-3, 112-4 and the reflector assembly 120 may be referred to as a wind measurement arrangement. In the following, where applicable, any individual one of the transducers 112-1, 112-2, 112-3, 112-4 as a transducer 112-$k$, whereas the transducers 112-1, 112-2, 112-3, 112-4 may be jointly referred to as transducers 112 or as a set of transducers 112. Moreover, when referring to any pair of transducers among the transducers 112, these two transducers may be referred to as transducers 112-$m$ and 112-$n$.

Each transducer 112-$k$ may be arranged to transmit a respective measurement signal towards the reflector assembly 120 and receive respective reflections of respective measurement signals transmitted from other ones of the transducers 112 from the reflector assembly 120, thereby enabling measurement of characteristics (such as speed and direction) of the airflow passing through the measurement volume. The wind measurement apparatus 100 may be also referred to as an anemometer apparatus and it may be applicable for measuring one or more wind characteristics, such as wind speed and wind direction, via usage of acoustic measurement signals transmitted from and received at each transducer 112-$k$, thereby implementing acoustic wind measurement.

The transducers 112 are arranged at respective locations that correspond to respective vertices of a (conceptual) regular tetrahedron, which may be referred to as a reference tetrahedron, whereas the reflector assembly 120 comprises a reflector element arranged substantially at the center point of the reference tetrahedron formed by the respective locations of the transducers 112. The reflector element may comprise a solid with eight vertices and six concave surfaces that serve as respective reflector surfaces, which reflector surfaces may be substantially identical to each other. The concave surfaces of the reflector element may be referred to as concave faces (of the solid serving as the reflector element). The shape of the reflector element may be defined via an arrangement of two regular tetrahedra, which may be referred to as a first and second underlying reflector tetrahedra. Non-limiting examples of defining the shape of the reflector element via the first and second tetrahedra are provided in the following. In an example, the first and second underlying reflector tetrahedra may be substantially similar in size (and hence substantially identical), which may result in the reflector element visually resembling a cube, as it is a solid that has eight vertices and six concave faces that correspond to respective (planar) faces of a cube. In another example, the first and second underlying reflector tetrahedra may be different in size, which likewise results in a solid that has eight vertices and six concave surfaces but that does not necessarily have a visual resemblance to any specific regular or non-regular hexahedron. Examples of using the first and second underlying reflector tetrahedra to define the shape of the reflector element are provided in the following.

The first reflector tetrahedron may be co-centered with the reference tetrahedron and it may be oriented the same as the reference tetrahedron that defines the respective locations of the four transducers 112 at its vertices. In other words, the first reflector tetrahedron is aligned with the reference tetrahedron such that respective edges of these two tetrahedra are in parallel to each other and the four vertices of the first reflector tetrahedron constitute respective vertices of the reflector element. Consequently, there is a respective vertex of the reflector element (i.e. a respective vertex of the first reflector tetrahedron) facing each of the transducers 112, where a vertex facing a certain transducer 112-$k$ may be referred to as a vertex (of the reflector element) associated with the respective transducer 112-$k$ and, conversely, a transducer facing a certain vertex of the reflector element may be referred to as a transducer 112-$k$ associated with the respective vertex. Hence, each of these four vertices of the reflector element defined via the first reflector tetrahedron is associated with a respective one of the transducers 112.

The second reflector tetrahedron may be aligned as a dual of the first reflector tetrahedron such that the vertices of the second reflector tetrahedron correspond to faces of the first tetrahedron (and vice versa) and, consequently, the first and second reflector tetrahedra form a compound of two tetrahedra having eight vertices. The four vertices of the second reflector tetrahedron constitute respective vertices of the reflector element, thereby resulting in the reflector element having eight vertices, where four vertices comprise respective vertices of the first reflector tetrahedron and the other four vertices comprise respective vertices of the second reflector tetrahedron.

The four vertices defined via the second reflector tetrahedron are not associated with any of the transducers 112 and, consequently, these remaining vertices of the reflector element may be applied, for example, for mounting the reflector element of the reflector assembly 120 to the frame assembly 110 (e.g. as shown in the schematic illustration of FIG. 1).

According to an example, the first and second reflector tetrahedra are equal in size and, consequently, the eight vertices of the resulting compound of these two tetrahedra serve as respective vertices of a cube that contains the first and second tetrahedra. Conceptually, joining each set of four vertices that correspond to the same one of the square faces of said cube with a respective concave surface results in the reflector element having six concave faces, each corresponding to a respective face of the cube and serving as a respective reflector surface of the resulting reflector element. Alternatively, the respective set of four vertices joined by the respective concave surface may be defined as a set of those four vertices of the compound of the first and second reflector tetrahedra that are adjacent to each other and/or as a set of those four vertices that are on the same side of the joint center of the first and second reflector tetrahedra (defined e.g. via a plane that intersects said joint center). Moreover, joining each pair of vertices that are connected by a respective edge of the cube with a respective curve results in the reflector element having twelve curves that each connect a respective pairs of vertices of the compound of the first and second tetrahedra, each curve corresponding to a respective edge of the cube. An example of such reflector element is schematically illustrated in FIG. 1A. In this regard, the curves that connect the respective adjacent pairs of vertices of the compound of the first and second reflector tetrahedra may be referred to as respective curved edges (of the solid serving as the reflector element).

According to another example, the first and second reflector tetrahedra are different in size and, consequently, the eight vertices of the resulting compound of these two tetrahedra serve as respective vertices of a solid that constitutes the resulting reflector element. Conceptually, joining each set of four vertices of the compound of the first and second reflector tetrahedra that are adjacent to each other (or that are on the same side of the joint center of the first and second reflector tetrahedra) with a respective concave surface results in the reflector element having six concave faces, each serving as a respective reflector surface of the resulting reflector element, whereas joining each adjacent pair of vertices of the compound of the first and second reflector tetrahedra with a respective curve results in the reflector element having twelve curved edges. An example of such reflector element is schematically illustrated in FIG. 1B.

Further regarding the orientation of the transducers 112 with respect to the reflector element of the reflector assembly 120, each transducer 112-$k$ has its front face facing the vertex of the reflector element that is associated with the respective transducer 112-$k$. Each transducer 112-$k$ may be arranged to transmit, via its front face, a transmitter (TX) beam that conveys a measurement signal towards the reflector assembly 120 for reflection therefrom and for subsequent reception at the other transducers 112. Conversely, each transducer 112-$k$ may be arranged to receive, from the direction of the reflector assembly 120, respective partial reflections of respective TX beams conveying respective measurement signals transmitted towards the reflector assembly 120 from the other transducers 112. Further aspects related to transmission, reflection, reception and characteristics of the TX beams conveying the measurement signal are described in the examples provided in the following.

The frame assembly 110 according to the respective examples of FIGS. 1A and 1B comprises a circular frame portion for mounting the transducers 112-1, 112-2, 112-3 and three arc-shaped frame portions coupled to the circular frame portion for mounting the transducer 112-4. Moreover, the frame assembly 110 according to the respective examples of FIGS. 1A and 1B further comprises four support rods for mounting the reflector assembly 120, where three of the support rods are coupled to the respective arc-shaped frame portions and the fourth support rod may be coupled to a 'base element' of the wind measurement apparatus 100 (not shown in the illustration of FIG. 1 for graphical clarity). In this regard, the frame assembly 110 according to the schematic illustrations of FIGS. 1A and 1B serves as a non-limiting example of an applicable frame structure and basically any structural arrangement that allows for an airflow through the measurement volume defined by the transducers 112 is applicable in the framework of the present invention.

Figure 2:
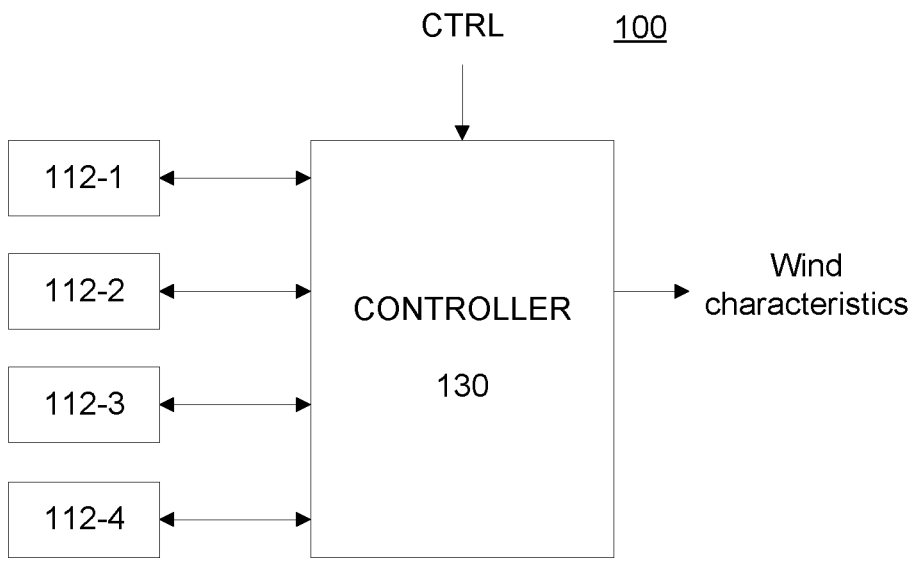
FIG. 2 illustrates a block diagram of some elements of a wind measurement apparatus according to an example.

Before proceeding into a more detailed description of examples concerning characteristics and role of the reflector element in terms of reflecting the measurement signals transmitted towards the reflector element, a brief overview of operation of the wind measurement apparatus is provided via references to FIG. 2, which illustrates a block diagram of some (logical) elements of the wind measurement apparatus 100 according to the first example. In this regard, FIG. 2 illustrates the transducers 112-1, 112-2, 112-3, 112-4 and a control portion 130. The control portion 130 may control at least some aspects of operation of the transducers 112 e.g. transmission of respective measurement signals from the transducers 112 in form of the respective TX beams and capturing of measurement signals reflected from the reflector assembly 120 at the transducers 112. Moreover, the control portion 130 may derive one or more wind characteristics based on respective observed propagation delays of the measurement signals from one of the transducers 112 to the other ones of the transducers 112, e.g. based on time delays between transmission of the measurement signals from each transducer 112-k and their reception at the other transducers 112, thereby providing a time-of-flight based wind measurement. The control portion 130 may receive control input (CTRL) via a user interface of the wind measurement apparatus 100 or from another apparatus and the control portion 130 may output at least part of the derived wind characteristics via the user interface and/or transmit the derived wind characteristics to another apparatus.

According to an example, the respective measurement signals conveyed in the respective TX beams may comprise signals that may be characteristic to the applied transducers 112, whereas in another example the respective measurement signals may be supplied for transmission in the respective TX beam by the respective transducer 112-k. In the former scenario, the control portion 130 may operate the transducers 112 to transmit the respective measurement signals according to a predefined schedule, whereas in the latter scenario, the control portion 130 may provide the transducers 112 with the respective measurement signals for transmission therefrom according to the predefined schedule. The respective TX beam transmitted from the transducer 112-k may be divergent to an extent that depends on characteristics of the transducer 112-k.

The measurement signals conveyed in the TX beam may convey a certain waveform, e.g. a pulse or a sequence of pulses. Consequently, the propagation time of the measurement signal from the transducer 112-m to the transducer 112-n may be conveniently determined at the control portion 130 via matching the respective pair of the certain waveform in the measurement signal transmitted from the transducer 112-m and its 'copy' in the measurement signal captured at the transducer 112-n. Such an approach for measurement of wind characteristics such as wind speed and/or wind direction in general is known in the art and hence further details in this regard are not provided in the present disclosure.

The measurement signal conveyed in the respective TX beam transmitted from the transducer 112-k may comprise an ultrasonic signal and, hence, the transducer 112-k may comprise a respective ultrasonic transducer. As a non-limiting example in this regard, each of the transducers 112 may comprise a respective piezoelectric transducer, e.g. a cylindrical piezoelectric transducer that radiates a relatively wide TX beam or a linear piezoelectric transducer that radiates a relatively narrow TX beam. Usage of the linear piezoelectric transducers may be advantageous in that they provide a cost-effective solution while providing a TX beam of sufficient width in view of certain advantageous characteristics of the reflector assembly 120, which are described in further detail in the following.

Each transducer 112-k is oriented with respect to the reflector element such that the center axis of the respective TX beam originating therefrom may be directed to a respective target position on the reflector element. In this regard, the target position for a certain transducer 112-k may be located at the vertex of the reflector element associated with the respective transducer 112-k. Due to the concave faces of the reflector element serving as the respective reflector surfaces, a curved edge connecting two vertices of the reflector element forms a ridge between the concave reflector surfaces on opposite sides of the respective curved edge, whereas a vertex of the reflector element forms an apex where three concave faces of the reflector element meet. Due to divergence of the TX beam transmitted from the transducer 112-k, a 'footprint' of the respective TX beam on the concave faces of the reflector element extends to cover a respective portion of the three concave reflector surfaces of the reflector element that meet at the apex formed at the respective vertex of the reflector element. Consequently, the TX beam transmitted from the transducer 112-k is reflected from the reflector element in three portions, where due to the concave shape of the reflector surfaces each of these three portions is reflected into a direction that is different from that of the other portions and, in particular, towards a respective other one of the transducers 112.

The wind measurement arrangement according to the present disclosure enables substantially simultaneous measurement on twelve measurement paths via usage of four transducers 112. This aspect is schematically illustrated via FIG. 4 that shows measurements paths $P_{1,2}$, $P_{1,3}$, $P_{1,4}$, $P_{2,1}$, $P_{2,3}$, $P_{2,4}$, $P_{3,1}$, $P_{3,2}$, $P_{3,4}$, $P_{4,1}$, $P_{4,3}$, $P_{4,3}$ between each transducer pair among the set of transducers 112, where $P_{m,n}$ denotes a transmission path from the transducer 112-m to the transducer 112-n via the respective reflector surface of the reflector element. While substantially simultaneous measurements from three measurement paths has been typically considered as a minimum requirement for reliable determination of wind speed and wind direction, availability of substantially simultaneous measurements from the twelve measurement paths $P_{m,n}$ enables superior measurement results in terms of their accuracy and reliability via redundancy provided by the additional measurement paths, which may be especially advantageous in measurements carried out in strong winds.

Assuming that the respective reflector surfaces formed by the concave faces of the reflector element are substantially identical in their shape, the above-described reflection of the TX beam in three portions results in splitting the TX beam into three reflected portions of substantially similar shape and size. Moreover, each of the three reflected TX beam portions transfers energy that is substantially equal to the energy transferred in other reflected TX beam portions. Hence, the reflector assembly 120 serves to split the TX beam transmitted from the transducer 112-*k* into three substantially similar reflected TX beam portions, each directed towards respective other one of the transducers 112. Moreover, the concave shape of the reflector surfaces contributes towards focusing the TX beam portions from a relatively large area of the respective reflector surface towards the respective other ones of the transducers 112 while at the same time inherently amplifying the measurement signals conveyed in the respective reflected TX beam portion. Consequently, some advantages of the wind measurement apparatus 100 may be summarized as follows:

The splitting of the TX beam originating from the transducer 112-*k* into the three reflected TX beam portions at the reflector element of the reflector assembly 120 for respective reception by the other three transducers of the set of transducers 112 enables simultaneous measurement at twelve measurement paths via usage of only four transducers, thereby enabling accurate, reliable and robust arrangement for wind measurement via usage of a relatively small number of components and, consequently, providing a cost-effective approach for wind measurement. Moreover, the concave shape of the reflector surfaces in the reflector element enables a relatively short measurement distance (i.e. the distance between the transducers 112 and the reflector assembly 120), thereby allowing for relatively small size of the wind measurement apparatus 100, which is advantageous in a majority of usage scenarios.

Another advantage of the wind measurement apparatus 100 according to the present disclosure involves simultaneous focusing and amplification of the measurement signals conveyed in the reflected TX beam portions and automatic directional correction, which both are consequences of the concave shape of the reflector surfaces of the reflector element:

Due to the concave shape of the reflector surfaces, measurement signal components conveyed in the TX beam transmitted from a certain transducer 112-*k* are reflected towards the other one ones of the transducers 112 from a relatively large sub-area of the reflector surface (e.g. in comparison to reflections from a reflector having a substantially planar surface). This characteristic of the reflector surface serves to provide directional correction e.g. in a scenario where the respective TX beam misses its target position e.g. due to strong wind, due to minor irregularities in the shape of the reflector surfaces due manufacturing tolerances, and/or due to (minor) structural damage caused to the wind measurement apparatus 100.

Due to the concave shape of the reflector surfaces, the propagation time of the signal components conveyed in the respective TX beam transmitted from a certain transducer 112-*k* to the other ones of the transducers 112 is substantially similar regardless of the position of the reflector surface serving to reflect these signal components. An advantage arising from this characteristic of the concave reflector surface is that the signal components across the respective TX beam transmitted from the transducer 112-*k* arrive at the other ones of the transducers 112 substantially simultaneously, thereby amplifying the measurement signal e.g. in comparison to usage of substantially planar reflector surface and/or in comparison to a scenario that applies direct transmission of the TX beam from one transducers 112 to another. Such amplification may be especially advantageous for (more than) compensating for the loss of signal power that occurs due to splitting the respective TX beams transmitted from the transducer 112-*k* into the three reflected TX beam portions at the reflector element.

As described in the foregoing, the concave faces of the cubical reflector element serve as respective concave reflector surfaces that are substantially identical in shape and that are arranged for coupling a respective pair of transducers 112-*m* and 112-*n* to each other. As an example in this regard, each reflector surface may have a shape that substantially follows a shape of a portion of an underlying ellipsoid, thereby providing the six concave faces of the reflector element as respective substantially ellipsoidal concave reflectors. According to an example, the respective ellipsoidal surface of the reflector element that serves to reflect respective TX beam portions between the transducers 112-*m*, 112-*n* (i.e. a reflector surface that couples the transducer 112-*m* to the transducer 112-*n* and vice versa) may be defined as a portion of a (conceptual) underlying ellipsoid positioned with respect to the transducers 112-*m*, 112-*n* such that the respective center points of the front faces of the transducers 112-*m*, 112-*n* are positioned along a first principal axis of the underlying ellipsoid at an equal distance from the center point of the underlying ellipsoid while a second principal axis of the underlying ellipsoid defines a position and orientation of a reference axis that meets the center point of the reference tetrahedron formed by the respective locations of the transducers 112 and that bisects a (conceptual) line segment connecting the center points of the respective front faces of the transducers 112-*m*, 112-*n* (and hence the center point of the underlying ellipsoid). In this regard, the second principal axis also serves as a symmetry axis of the respective reflector surface and it may be also referred to as a center axis of the respective reflector surface.

Further in this regard, the reference axis that connects the center point of the reference tetrahedron formed by the respective locations of the transducers 112 and that bisects the (conceptual) line segment connecting the center points of the respective front faces of the transducers 112-*m*, 112-*n* meets this line segment in a normal angle and meets the reflector surface at a point that may be considered as a center point of the respective reflector surface. In this regard, a tangent plane of the reflector surface at its center point is parallel to a surface normal of the reference axis, whereas the center point of the reflector surface may be also referred to as a zero-gradient point of the respective reflector surface.

Figure 3:
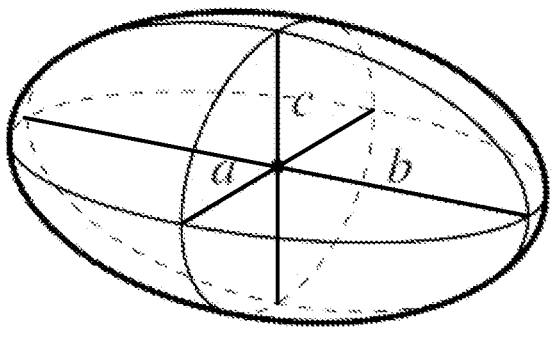
FIG. 3 illustrates some characteristics of an ellipsoidal shape according to an example.

The 'depth' of the ellipsoidal shape of the respective reflector surface (from the first principal axis of the underlying ellipsoid to the portion of its surface defining the respective reflector surface) may be defined via choosing a length of the second principal axis of the underlying ellipsoid and the respective positions of the transducers 112-*m*, 112-*n* along the first principal axis of the underlying ellipsoid such that the respective ellipsoidal reflector surfaces defined for each transducer pair 112-*m*, 112-*n* form the respective concave faces of the reflector element. A suitable shape of the reflector surface of the reflector element in relation to the positions of the transducers 112-*m*, 112-*n* (for each pair of the transducers 112-*n*, 112-*n*) may be found, for example, via an experimental procedure via application of suitable simulation tool(s). Considering the relationship between the ellipsoidal shape of the reflector surface that couples the transducers 112-*m* and 112-*n* and the respective locations of the transducers 112-*m* and 112-*n* in view of the ellipsoid illustrated in FIG. 3, the center points of the respective front faces of the transducers 112-*m* and 112-*n* may be disposed on the principal axis b at a distance D from the center point of the underlying ellipsoid (shown as a dot where the principal axes a, b and c meet) at opposite sides of the center point, whereas one of the other principal axes (i.e. one of the principal axes a and c) may serve as the symmetry axis of the resulting reflector that hence defines the reference axis and also serves as the center axis of the resulting reflector surface.

In a variation of the example described in the foregoing in detail, the (conceptual) line segment that connects the transducers 112-*m*, 112-*n* may not coincide with the first principal axis of the underlying ellipsoid that defines the shape of respective reflector surface of the reflector element but the underlying ellipsoid may be shifted along the second principal axis of the underlying ellipsoid (i.e. the one that defines the reference axis described above) such that the first principal axis of the underlying ellipsoid is offset from said (conceptual) line segment by a desired distance. Such offset may enable further flexibility in adjusting the curvature of the reflector surface and/or the 'depth' of the reflector surface in view of any requirements that may pertain e.g. to the reflection characteristics of the reflector element and/or the size of the wind measurement apparatus 100.

While the ellipsoidal reflector surface described in the foregoing and illustrated in the example of FIG. 1B may provide optimized performance in terms of focusing and amplifying the respective portion of the TX beam originating from the transducer 112-*m* to the transducer 112-*n* and vice versa, also other concave reflector surface shapes provide advantages in terms of focusing and amplifying the respective portions of the TX beam between the transducers 112-*m*, 112-*n* (in comparison to a planar reflector surface or to a direct transmission path between the transducers 112-*m*, 112-*n*) while the exact shape of the reflector surface may not have an effect on the TX-beam-splitting functionality described in the foregoing. As non-limiting examples in this regard, the shape of the reflector surfaces may follow a shape of a portion of an underlying symmetrical concave surface different from an ellipsoid. Examples of such symmetrical reflector surface shapes include a spheroidal shape (as in the example of FIG. 1A) and a paraboloidal shape, where the reflector surface may be arranged with respect to the center points of the respective front faces of the transducers 112-*m*, 112-*n* such that its center axis (i.e. symmetry axis) defines the reference axis that meets the center point of the tetrahedron formed by the respective locations of the transducers 112 and that bisects the (conceptual) line segment connecting the center points of the respective front faces of the transducers 112-*m*, 112-*n* (for each pair of the transducers 112-*m*, 112-*n*).

In a further example, the reflector surface may not be necessarily symmetric about a symmetry axis while it may be symmetric with respect to a reference plane that is perpendicular to the (conceptual) line segment connecting the center points of the respective front faces of the transducers 112-*m*, 112-*n* (for each pair of the transducers 112-*m*, 112-*n*) and located at a position where the reference axis (as defined above) meets said (conceptual) line segment, thereby ensuring substantially similar power transfer characteristics between the transducers 112-*m*, 112-*n* in both directions.

In general case, the shape of the reflector surface that couples the transducer 112-*m* to the transducer 112-*n* and vice versa may be defined via the reference axis that meets the center point of the reference tetrahedron formed by the respective locations of the transducers 112 and that bisects the (conceptual) line segment connecting the center points of the respective front faces of the transducers 112-*m*, 112-*n*: the concave shape of the reflector surface with respect to respective locations of the transducers 112-*m*, 112-*n* may be such that the reference axis meets the respective reflector surface at a normal angle (i.e. the reference axis is perpendicular to a tangent plane of the reflector surface at the point where the reference axis meets the reflector surface).

Such shape and positioning of the respective reflector surface with respect to respective locations of the transducers 112-*m*, 112-*n* (and/or such positioning of the transducers 112-*m* and 112-*n* with respect to the shape and position of the reflector surface) provides a consistent path between the transducers 112-*m*, 112-*n* via reflection from the respective reflector surface substantially regardless of the distance between the line connecting the transducers 112-*m*, 112-*n* and the center point (i.e. the zero-gradient point) of the reflector surface. The consistent path substantially guarantees that regardless of the speed and direction of the airflow and regardless of the shape of reflector surface around the zero-gradient point a measurement signal originating from one of the transducers 112-*m* and 112-*n* that meets the zero-gradient point is received at the other one of the transducers 112-*m* and 112-*n*. Moreover, due to the concave shape of the reflector surface also the measurement signals originating from one of the transducers 112-*m* and 112-*n* that meet a sub-area around the zero-gradient point are likewise received at the other one of the transducers 112-*m* and 112-*n*, where the size of the sub-area is dependent on the curvature of the reflector surface. Consequently, respective reflection characteristics for reflecting and focusing a portion the TX beam originating from the transducer 112-*m* towards the transducer 112-*n* and for reflecting and focusing a portion of the TX beam originating from the transducer 112-*n* towards the transducer 112-*m* are substantially similar to each other, thereby facilitating efficient power transfer between the transducers 112-*m* and 112-*n* with substantially similar power transfer characteristics in both directions.

The examples described in the foregoing generally refer to substantially simultaneous measurement carried out on a multiple measurement paths, which enables accurate and reliable wind measurements. In the course of operation of the wind measurement apparatus 100, the control portion 130 may operate the transducers 112 to periodically transmit the measurement signal in the respective TX beams. In this regard, the transmission of the measurement signals from the transducers 112 may be carried out according to pre-defined schedule, typically at predefined time intervals, where the time delay between two successive transmissions of the measurement signal from the transducers 112 may be referred to as a measurement interval. In this regard, the shorter measurement interval may result in improved measurement performance in terms of the ability to track any changes in wind characteristics without undue delay.

In the wind measurement apparatus 100, a portion of the TX beam received at a certain transducer 112-*k* (via reflection from the reflector assembly 120) may be further reflected from the front face of the respective transducer 112-*k*, thereby providing a reflected TX beam that may be further transferred (via the reflector assembly 120) towards the other ones of transducers 112. Moreover, the portion of the TX beam reflected from the front face of a certain one of the transducers 112 may be further reflected from the front faces of the other ones of the transducers 112 and so on, thereby possibly providing a chain of reflections that gradually attenuates. In other words, the symmetrical design of the wind measurement apparatus 100 may result in the measurement signals originally transmitted from one of the transducers 112 over multiple hops due to respective portions of the TX beams received at the other ones of the transducers 112 being reflected from their respective front faces via the reflector assembly 120 further towards the other ones of the transducers 112.

Figure 4:
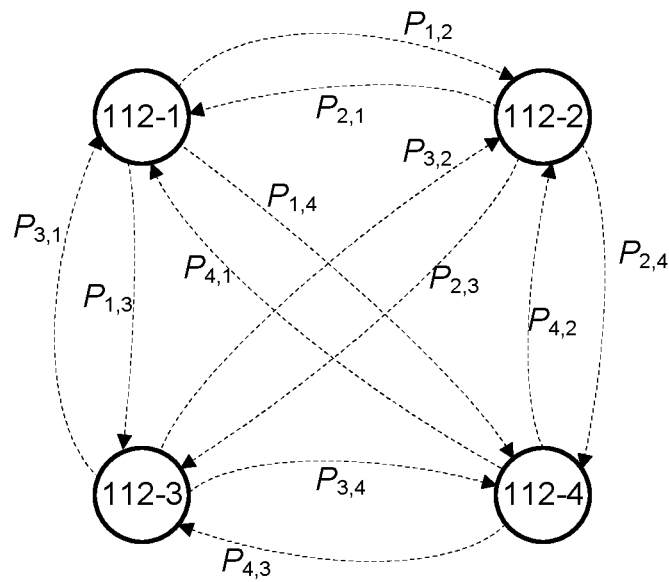
FIG. 4 schematically illustrates measurement paths between transducers of a wind measurement apparatus according to an example.

Considering this phenomenon with references to the measurement paths $P_{m,n}$ illustrated in FIG. 4, the measurement signal transmitted in the respective TX beam from the transducer 112-1 and received at the other ones of the set of transducers 112 via the measurement paths $P_{1,2}$, $P_{1,3}$ and $P_{1,4}$ may be reflected onwards:

the TX beam received at the transducer 112-2 over the measurement path $P_{1,2}$ may be reflected from its front face over the measurement paths $P_{2,1}$, $P_{2,3}$ and $P_{2,4}$;

the TX beam received at the transducer 112-3 over the measurement path $P_{1,3}$ may be reflected from its front face over the measurement paths $P_{3,1}$, $P_{3,2}$ and $P_{3,4}$; and the TX beam received at the transducer 112-4 over the measurement path $P_{1,4}$, may be reflected from its front face over the measurement paths $P_{4,1}$, $P_{4,3}$ and $P_{4,3}$.

Moreover, the measurement signals received in the reflected TX beam that is reflected from the front face of a certain transducer 112-*k* may be further received at the other ones of the transducers 112 and reflected onwards from their respective front faces. Consequently, a TX beam originally transmitted from one of the transducers 112 may be transferred over multiple hops. In this regard, transfer of the TX beam from a transducer 112-*k* originally transmitting the respective TX beam to other ones of the transducers 112 may be referred to as a primary hop, whereas transfer of the TX beam reflected from the front face of a transducer 112-*k* to other ones of the transducers 112 may be referred to as a respective secondary hop. Hence, the TX beam originally transmitted from the transducer 112-*k* may be transferred over the primary hop that may be further followed by one or more secondary hops.

While in practice the measurement signals attenuate to some extent at each hop due to reflection from the respective front face of one of the transducers 112-*k*, due to the focusing and amplifying characteristics of the reflector element (discussed in the foregoing) no significant attenuation occurs along the signal paths $P_{m,n}$ from one of the transducers 112 to another. Consequently, the measurement signals conveyed in the reflected portions of the TX beam(s) may only gradually attenuate when transferred over multiple hops. One of the consequences of such cascaded transfer of the measurement signals over the multiple hops is that due to the gradual attenuation the reflected measurement signals may remain at a level that would disturb a subsequent measurement despite having been transferred over several hops and, therefore, the control portion 130 may need to wait for the signal levels of the reflected measurement signals to attenuate below a reference level before controlling the transducers 112 to transmit subsequent measurement signals in order to prevent reflections of the previously transmitted measurement signals from disturbing measurement carried out based on the subsequent measurement signals. In this regard, the reference level may be defined, for example, as a predefined percentage of the signal level at the transducer 112-*k* upon receiving the measurement signal over the primary hop, whereas the time (e.g. average time) it takes for the measurement signal to attenuate below the reference level may be referred to as an attenuation time.

The examples described in the foregoing implicitly aim at maximizing the power transfer in the TX beam transmitted from a certain transducer 112-*k* to the other ones of transducers 112 via setting the respective target positions of the respective TX beams originating from the transducers 112 to associated vertices of the reflector element and via shaping the reflector surfaces for efficient power transfer over the first hop from the transducer 112-*k* to the other ones of transducers 112, thereby aiming at maximizing the signal power transferred from the respective transducer 112-*k* to the other ones of the transducers 112 in view of respective locations (and orientations) of the transducers 112 and in view of the respective positions and shapes of the reflector surfaces. While such selection of the target positions serves to optimize the power transfer over the primary hop, at the same time it also maximizes the power transmission over the one or more secondary hops and, consequently, maximizes the attenuation time.

In case the resulting attenuation time is short enough to enable application of a desired measurement interval, the gradual attenuation of the measurement signal over the cascaded reflections do not constitute a performance issue but, on the contrary, the reflected measurement signals received over one or more secondary hops may be applied to increase robustness of the measurement: while the above-described derivation of the one or more wind characteristics (via operation of the control portion 130) implicitly relies on respective propagation delays of the respective measurement signals transferred over the primary hops, derivation of the one or more wind characteristics may further rely on respective propagation delays of the reflected measurement signals transferred over one or more secondary hops. Such an approach enables at least the following advantages over consideration of the measurements carried out based on the primary hops only:

Consideration of at least one secondary hop in derivation of the one or more wind characteristics at least doubles the amount of data available for estimation of wind characteristics. Even though the measurement signal attenuates to some extent in each consecutive hop, the measurement signals conveyed over a first few secondary hops (e.g. over the first secondary hop or over the first two secondary hops) typically still provide information that enables reliable estimation of propagation delays over the respective secondary hop, thereby providing further measurement data that enables overall improvement in derivation of the one or more wind characteristics.

Consideration of at least one secondary hop in derivation of the one or more wind characteristics enables relatively accurate and reliable derivation of the one or more wind characteristics even if one of the transducers 112 suffers a malfunction: even though one of the transducers 112 would be unable to transmit and/or receive the measurement signals, its front face still serves to reflect the measurement signals arriving thereat over the primary hop or over a secondary hop. As an example in this regard, while the reflected measurement signal transferred over the first secondary hop is attenuated to some extent in comparison to the measurement signal transferred over the primary hop, it typically still provides data that allows for derivation of the one or more wind characteristics even when information derivable from the measurement signal transferred over the respective signal path as the primary hop is not available.

On the other hand, in some scenarios the resulting attenuation time may not be short enough to enable application of the desired measurement interval, the gradual attenuation of the measurement signal over the cascaded reflections thereby resulting in a performance issue either in terms of forcing usage of a measurement interval that is longer than the desired one in order to ensure the reflected measurement signals attenuating below the reference level before transmitting subsequent measurement signals from the transducers 112 or in terms of possibly compromised measurement results due to presence of reflected measurement signals having signal levels that exceed the reference level upon transmitting subsequent ones.

A straightforward approach for controlling the attenuation time involves usage of reduced transmission power for transmitting the measurement signals from the transducers 112 while keeping the structure of the measurement arrangement unchanged from that described in the foregoing, thereby reducing the number of hops over which the level of the reflected measurement signal still remains above the reference level. In this regard, the transmission power that results in a desired attenuation time and/or that results in a desired number of secondary hops with the reflected signal level still exceeding the reference level may be applied, where the applicable transmission power may be found via an experimental procedure via usage of suitable simulation tool(s). Even though such an approach enables receiving the respective portions of the TX beams transmitted from the transducers 112-$k$ in their entirety at other ones of transducers 112, this approach necessarily results in reduced signal power also over the primary hop, which typically degrades the measurement performance, especially in challenging measurement conditions such as in very strong winds.

Another approach for controlling the attenuation time involves modifying one or more characteristics of the wind measurement arrangement from the design described in the foregoing in order to limit the power transfer in the respective partial reflections of the TX beams from respective front faces of the transducers 112. Such modification may involve adjusting respective orientations of the transducers 112 with respect to the reflector assembly 110 and/or providing the respective reflector surfaces of the reflector element such that they have a shape that is arranged to facilitate power transfer in the respective TX beams transmitted from the transducers 112 for reception after a first refection from the reflector assembly 120 (e.g. to facilitate power transfer over the primary hop) while limiting power transfer in reflections of the (partial) TX beams from respective front faces of the transducers 112 after the first reflection from the reflector assembly 120 (e.g. to limit power transfer over secondary hops).

An example of modifying the design of the wind measurement arrangement such that power transferred in the TX beams reflected from the front faces of the transducers 112 is limited involves adjusting respective orientations of the transducers 112 with respect to the reflector assembly 120 such that the respective target positions for the center axes of the respective TX beams transmitted from the transducers 112 are offset from the respective associated vertices of the reflector element by a predefined margin while keeping other aspects of the structure of the wind measurement arrangement unchanged from that described above, thereby providing less than optimal power transfer via reflection from the reflector assembly 120. Consequently, even though due to focusing characteristics of the concave reflector surfaces the signal power transferred over the primary hop is typically only slightly compromised, due to the offset that is accruing over cascaded secondary hops the reflected signal level attenuates below the reference level over a reduced number of hops, thereby shortening the attenuation time. According to an example, the offset from the reference position may be provided along one of the curved edges that meet at the respective vertex of the reflector element, whereas in another example the offset may bring the target position off the respective curved edges that meet at the respective vertex. A suitable offset that results in a desired attenuation time and/or that results in a desired number of secondary hops with the reflected signal level still exceeding the reference level may be found via an experimental procedure via usage of suitable simulation tool(s).

Another example of modifying the design of the wind measurement arrangement such that power transferred in the TX beams reflected from the front faces of the transducers 112 is limited comprises offsetting the respective locations of the transducers 112 from their respective positions that form the reference tetrahedron by respective predefined distances while keeping other aspects of the structure of the measurement arrangement unchanged from that described above, thereby arranging the transducers 112 into a constellation that does not strictly constitute a regular tetrahedron but that closely approximates one. Such offsetting of the transducer locations may result in a similar effect as described above for an approach that involves adjusting respective orientations of the transducers 112 with respect to the reflector assembly 120, whereas a suitable offset that results in a desired attenuation time and/or in a desired number of secondary hops with the reflected signal level still exceeding the reference level may be found via an experimental procedure via usage of suitable simulation tool(s).

A further example of modifying the design of the wind measurement arrangement such that power transmitted in the TX beams reflected from the front faces of the transducers 112 is limited involves designing the concave reflector surfaces of the reflector element such that for each reflector surface the respective reference axis meets the reflector surface in a non-normal angle. In this regard, the reference axis may be defined in the same manner as in the foregoing, i.e. as an axis that meets the center point of the tetrahedron formed by respective locations of the transducers 112 and that bisects the (conceptual) line segment that connects the center points of the respective front faces of the pair of transducers 112-$m$, 112-$n$ coupled by the respective reflector surface. An arrangement where the reference axis meets the reflector surface in a non-normal angle results in narrowing or even completely eliminating the consistent path between the pair of transducers 112-$m$, 112-$n$. Such design of the spatial arrangement of the transducers 112 and the reflector surfaces of the reflector element allows for controlled degradation of reflection characteristics between each pair of transducers 112-$m$, 112-$n$ in order to limit power transfer in the (partial) reflections of the TX beams from respective front faces of the transducers 112.

Still referring to the example of arranging the reference axis that (partially) defines the positions of the transducers 112 in relation to the respective reflector surface such that it meets the respective reflector surface in a non-normal angle, deviation from the normal angle may be chosen such that results in providing desired 'distortion' to the reflection characteristics, e.g. one that results in desired attenuation time and/or in a desired number of secondary hops with the reflected signal level still exceeding the reference level. An example of defining such positioning of the pair of transducers 112-m, 112-n with respect to the respective reflector surface may comprise translation of the underlying concave surface (e.g. the underlying ellipsoid, sphere or paraboloid) that defines the curvature of the reflector surface in relation to respective locations of the respective pair of the transducers 112-m, 112-n in comparison to their spatial relationship described in the foregoing in order to narrow or to eliminate the consistent path between the respective pair of transducers 112-m, 112-n. As an example in this regard, the translation may involve lateral translation along the reference plane defined by the (conceptual) line segment that connects the center points of the respective front faces of the transducers 112-m, 112-n together with the reference axis. The amount and direction of translation that results in a desired attenuation time and/or in a desired number of secondary hops with the reflected signal level still exceeding the reference level may be found via an experimental procedure via usage of suitable simulation tool(s).

Optionally, the above-described approach that involves shaping of the reflector surface such that the reference axis meets the reflector surface in a non-normal angle may further involve shaping the curvature in one or more sub-portions of the reflector surfaces in a manner that results in partially compensating for the (intentionally) compromised reflection characteristics between the respective pair of transducers 112-m, 112-n, which enables at least partially compensating for the reduced power transfer over the primary hop and a desired number of secondary hops. Such a design may result in the respective reflector surface having a first sub-portion having a shape that is substantially defined by a portion of underlying concave surface (e.g. an ellipsoid, a sphere or a paraboloid) and one or more second sub-portions having curvature different from that of the first sub-portion for enhancing transfer of the respective TX beams that are (actually) transmitted from the respective pair of transducers 112-m, 112-n (i.e. to enhance power transfer over the respective primary hops). In this regard, respective curvatures of the one or more second sub-portions of the reflector surface that result in a desired attenuation time and/or in a desired number of secondary hops with the reflected signal level still exceeding the reference level may be found via an experimental procedure via usage of suitable simulation tool(s).

Figure 5:
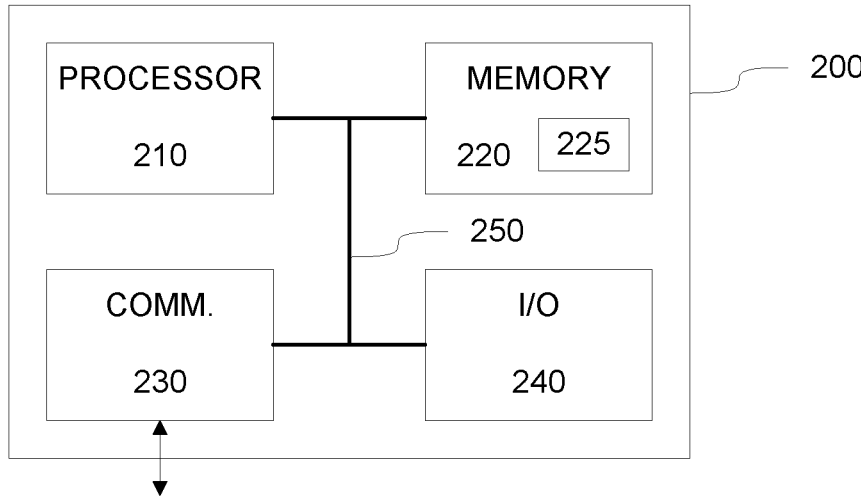
FIG. 5 illustrates a block diagram of some components of an apparatus according to an example.

FIG. 5 illustrates a block diagram of some components of an apparatus 200 that may be employed to implement operations described in the foregoing with references to the control portion 130. The apparatus 200 comprises a processor 210 and a memory 220. The memory 220 may store data and computer program code 225. The apparatus 200 may further comprise communication means 230 for wired or wireless communication with other apparatuses and/or user I/O (input/output) components 240 that may be arranged, together with the processor 210 and a portion of the computer program code 225, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 200 are communicatively coupled to each other via a bus 250 that enables transfer of data and control information between the components.

The memory 220 and a portion of the computer program code 225 stored therein may be further arranged, with the processor 210, to cause the apparatus 200 to perform at least some aspects of operation of the control portion 130 described in the foregoing. The processor 210 is configured to read from and write to the memory 220. Although the processor 210 is depicted as a respective single component, it may be implemented as respective one or more separate processing components. Similarly, although the memory 220 is depicted as a respective single component, it may be implemented as respective one or more separate components, some or all of which may be integrated/removable and/or may provide permanent/semi-permanent/dynamic/cached storage.

The computer program code 225 may comprise computer-executable instructions that implement at least some aspects of operation of the control portion 130 described in the foregoing when loaded into the processor 210. As an example, the computer program code 225 may include a computer program consisting of one or more sequences of one or more instructions. The processor 210 is able to load and execute the computer program by reading the one or more sequences of one or more instructions included therein from the memory 220. The one or more sequences of one or more instructions may be configured to, when executed by the processor 210, cause the apparatus 200 to perform at least some aspects of operation of the control portion 130 described in the foregoing. Hence, the apparatus 200 may comprise at least one processor 210 and at least one memory 220 including the computer program code 225 for one or more programs, the at least one memory 220 and the computer program code 225 configured to, with the at least one processor 210, cause the apparatus 200 to perform at least some aspects of operation of the control portion 130 described in the foregoing.

The computer program code 225 may be provided e.g. a computer program product comprising at least one computer-readable non-transitory medium having the computer program code 225 stored thereon, which computer program code 225, when executed by the processor 210 causes the apparatus 200 to perform at least some aspects of operation of the control portion 130 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc.

The invention claimed is:

1. A wind measurement apparatus comprising:
    a frame assembly;
    four transducers mounted to the frame assembly such that their respective locations serve as respective vertices of a regular tetrahedron; and
    a reflector assembly mounted to the frame assembly such that it is positioned substantially at a center of said regular tetrahedron at a distance from the transducers to allow for an airflow between the reflector assembly and each of the transducers, wherein the reflector assembly comprises a reflector element provided as a solid that has eight vertices and six substantially identical concave faces that serve as respective reflector surfaces and that is oriented with respect to said transducers such that each transducer is facing a respective vertex of the reflector element, wherein each transducer is arranged to:

transmit a respective measurement signal in a respective transmitter beam, TX beam, towards the reflector assembly such that the respective TX beam meets the three reflector surfaces that meet at the vertex of the reflector element faced by the respective transducer, and receive, via said three reflector surfaces, respective partial reflections of respective TX beams originating from other ones of said transducers.

2. The wind measurement apparatus according to claim 1, wherein each reflector surface is arranged to focus a portion of the respective TX beam originating from a first transducer of said transducers to a respective other one of said transducers and to focus a portion of the respective TX beam originating from said respective other one of said transducers to said first transducer.

3. The wind measurement apparatus according to claim 1, wherein said measurement signals comprise respective ultrasonic measurement signals.

4. The wind measurement apparatus according to claim 1, wherein each of said transducers comprises a respective piezoelectric transducer.

5. The wind measurement apparatus according to claim 4, wherein each of said transducers comprises a respective linear piezoelectric transducer.

6. The wind measurement apparatus according to claim 1, wherein each transducer is arranged to transmit the respective TX beam having its center axis directed towards a respective target position at the vertex of the reflector element faced by the respective transducer so as to split the respective TX beam into three portions of substantially similar shape and size for reflection from respective ones of said three reflector surfaces that meet at said vertex towards respective other ones of the transducers, thereby facilitating power transfer from the respective transducer to the other ones of said transducers.

7. The wind measurement apparatus according to claim 1, wherein each reflector surface is arranged to couple a pair of transducers and arranged with respect to said pair of transducers such that a reference axis meets the respective reflector surface at a normal angle, where said reference axis meets the center of said regular tetrahedron and bisects a line segment that connects said pair of transducers.

8. The wind measurement apparatus according to claim 1, wherein each reflector surface has a shape that substantially follows a shape of a portion of an underlying concave surface that comprises one of the following:

an ellipsoid, a sphere, a paraboloid.

9. The wind measurement apparatus according to claim 1, wherein each transducer is arranged to transmit the respective TX beam having its center axis directed towards a respective target position that is offset from the vertex of the reflector element faced by the respective transducer so as to split the respective TX beam into three portions of substantially different shapes and/or sizes for reflection from respective ones of said three reflector surfaces that meet at said vertex towards respective other ones of the transducers, thereby limiting power transfer in reflections of the respective TX beam transmitted from the respective transducer from respective front faces of the other ones of said transducers.

10. The wind measurement apparatus according to claim 1, wherein each reflector surface has a shape arranged to facilitate power transfer in the respective TX beam transmitted from the respective transducer for reception at the other ones of said transducers after a first reflection from the reflector assembly while limiting power transfer in reflections of the respective TX beam transmitted from the respective transducer from respective front faces of the other ones of said transducers.

11. The wind measurement apparatus according to claim 1, wherein each reflector surface is arranged to couple a pair of transducers and arranged with respect to said pair of transducers such that a reference axis meets the respective reflector surface at a non-normal angle, where said reference axis meets the center of said regular tetrahedron and bisects a line segment that connects said pair of transducers, thereby limiting power transfer in reflections of the respective TX beam transmitted from a first one of said pair of transducers from a front face of the other one of said pair of transducers.

12. The wind measurement apparatus according to claim 1, wherein each reflector surface comprises a first sub-portion and one or more second sub-portions, wherein the first sub-portion has a shape that is substantially defined by one of the following: a portion of an ellipsoid, a portion of a sphere, a portion of a paraboloid, and wherein the one or more second sub-portions have a curvature different from that of the first sub-portion for enhancing power transfer in the respective TX beam transmitted from the first one of said pair of transducers to the other one of said pair of transducers.

13. The wind measurement apparatus according to claim 1, further comprising a control portion arranged to:

operate said transducers to transmit the respective measurement signal in the respective TX beams and to capture the respective measurement signals received in the respective partial reflections of the respective TX beams transmitted from the other ones of said transducers; and derive one or more wind characteristic based on respective propagation times of the respective measurement signals transmitted from said transducers and captured at the other ones of said transducers.

14. The wind measurement apparatus according to claim 13, wherein the control portion is arranged to:

operate said transducers to further capture respective reflected measurement signals that are reflected from respective front faces of the other ones of said transducers; and derive the one or more wind characteristics further based on respective propagation times of the respective measurement signals transmitted from said transducers and captured at one or more of said transducers after reflections from respective front faces of the other ones of said transducers.

\* \* \* \* \*